No. 673,011. Patented Apr. 30, 1901.
W. W. ANNABLE.
PNEUMATIC SPRING FOR VEHICLES.
(Application filed Sept. 4, 1900.)

(No Model.)

Witnesses
Palmer A. Jones.
Ethel A. Fry

Inventor
Warren W. Annable
By Luther V. Moulton
Attorney

THE NORRIS PETERS CO., PHOTO-LITHO., WASHINGTON, D. C.

UNITED STATES PATENT OFFICE.

WARREN W. ANNABLE, OF GRAND RAPIDS, MICHIGAN, ASSIGNOR OF TWO-THIRDS TO G. STEWART JOHNSON AND J. WARREN BROWN, OF SAME PLACE.

PNEUMATIC SPRING FOR VEHICLES.

SPECIFICATION forming part of Letters Patent No. 673,011, dated April 30, 1901.

Application filed September 4, 1900. Serial No. 28,922. (No model.)

*To all whom it may concern:*

Be it known that I, WARREN W. ANNABLE, a citizen of the United States, residing at Grand Rapids, in the county of Kent and State of Michigan, have invented certain new and useful Improvements in Pneumatic Springs for Vehicles; and I do hereby declare the following to be a full, clear, and exact description of the invention, such as will enable others skilled in the art to which it appertains to make and use the same.

My invention relates to improvements in pneumatic springs for vehicles, and more especially to such springs for street-cars; and its objects are to provide means for automatically regulating the air-pressures in the same in accordance with the load, to provide a device that will be effective, cheap, and durable, to locate the regulating devices within the air-cushion, where they will be effectively protected from dust and injury, and to provide the device with certain new and useful features, hereinafter more fully described, and particularly pointed out in the claims.

My invention consists, essentially, in providing an inflatable air-cushion with inlet and exhaust openings and suitable inlet and exhaust valves within the air-cushion and operated by the movement of the same, whereby as the cushion is compressed by increased load air is admitted and when the said cushion is over-inflated relative to the load air will be exhausted from the same, as will more fully appear by reference to the accompanying drawings, in which—

Figure 1:
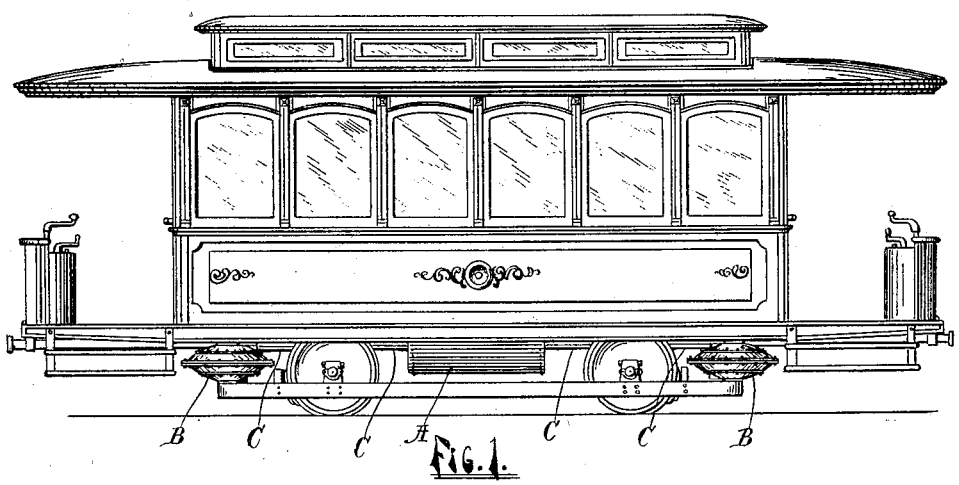
Figure 2:
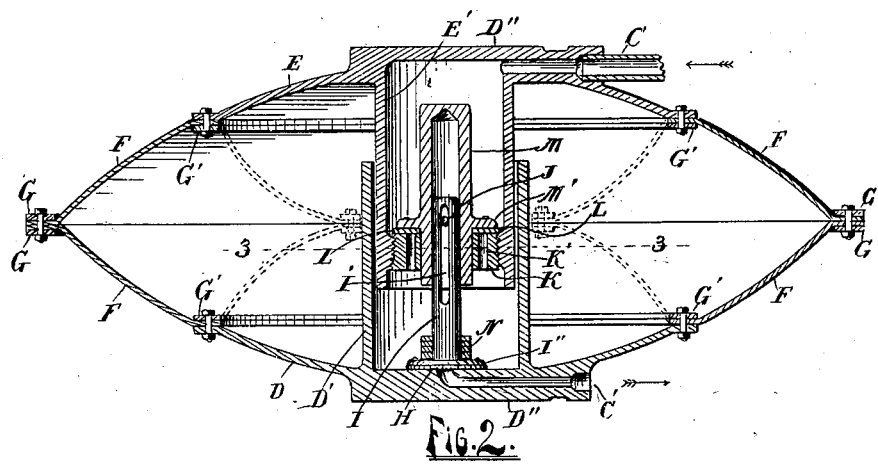
Figure 3:
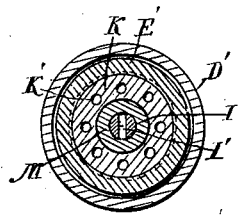

Figure 1 is a side elevation of a street-car with my device attached; Fig. 2, an enlarged axial vertical section of one of the pneumatic springs shown in Fig. 1, and Fig. 3 a transverse horizontal section of the tubes and inlet-valves on the line 3 3 of Fig. 2.

Like letters refer to like parts in all of the figures.

A represents any suitable air-tank to contain air under pressure, which air is supplied to the tank by any convenient means.

B represents my pneumatic springs interposed at convenient places between the car and truck-frame and supporting the car.

Pipes C connect the air-tank and the various springs to convey air to the latter.

The air-cushion proper consists of two concavo-convex disks D and E, connected by flexible annular margins F F, of rubber, leather, or other suitable material, secured to the respective disks at their inner edges by suitable rings and bolts G and to each other at their outer edges by clamping rings and bolts G G. Each disk is provided with a suitable seat D", by which the lower disk D engages the truck-frame and the upper disk E engages the car-body. Projecting inward around the axis of the disks are the open-end tubes D' and E', one of which is smaller than the other and extending within the same and slidably engages its interior, being freely movable therein and having sufficient clearance to allow air to pass freely between the tubes. The lower tube D' is preferably the largest. The air-pipe C is connected to the disk E and opens into the interior of the tube E'.

Inserted in the lower end of the tube E' is a valve-seat K, having a central opening to secure the stem M of the inlet-valve, which stem is provided with a flange M', to which is attached a facing L, of rubber or other suitable material, which flange engages the seat K and closes a series of vertical openings K' therein. The stem M is provided with an axial opening closed at the top to prevent air from passing through and open at the bottom to receive the upwardly-projecting stem I of the exhaust-valve, which latter at its lower end is flanged, as at I", to which flange is secured a suitable facing H to close the exhaust-opening C' in the lower disk D. The stem I is also provided with a longitudinal slot I', and a pin J passes through said slot and traverses the same. Washers N surround the stem I to limit the upward movement of the stem I within the stem M.

If restricted for room in which to place the air-cushions, I provide the flexible portions F and rings G G of less diameters and reverse their position, as indicated in dotted lines in Fig. 2, attaching the outer edges of said portions to the disks and the inner edges of the same to the rings.

From the foregoing the operation of my device will be readily understood. Air under pressure flows into the tube E', being retained therein as long as the inlet-valve remains closed. If, however, the pressure in the cushion should not be sufficient to sustain the load, the upper disk and its tube will descend until the valve-stem M contacts the washers N, when the inlet-valve will be raised from its seat thereby. This will open the passages K and permit air to flow into the lower tube, and thence between the tubes into the air-cushion until sufficient to raise the upper disk and close the valve, thus cutting off further supply. If the load should be reduced and the upper disk rise until the pin J engages the upper end of the slot I', the exhaust-valve will be lifted thereby and the air exhausted from the cushion until the upper disk again descends. The device is thus automatic in its action, and each spring acts independently, the pressure increasing or decreasing in each spring according to the load thereon. The device is also simple, cheap, and not easily got out of order, the valve mechanism being wholly within the air-cushion and fully protected thereby from dust and injury.

Having thus fully described my invention, what I claim, and desire to secure by Letters Patent, is—

1. The combination of an air-tank, an air-cushion connected to the tank and composed of two disks having inlet and exhaust openings, and flexible margins attached to the disks and to each other; valves to control said openings and located within the air-cushion, and means for connecting the valves with the upper disk whereby said valves are operated by the movement of the same, substantially as described.

2. The combination of a car, an air-tank, air-cushions connected to the tank and located between the truck and the body of the car; said air-cushions consisting of concavo-convex disks having inlet and exhaust openings and flexible margins attached to the disks at one edge and attached to each other at the other edge; inlet and exhaust valves within the air-cushion, and means for connecting said valves with the upper disks, substantially as described.

3. The combination of an air-cushion, having an inlet and an exhaust opening, inlet and exhaust valves and tubes slidably engaging each other, and operating said valves, substantially as described.

4. The combination of disks, having flexible margins attached to the respective disks and to each other, tubes projecting inward from the disks, and slidably engaging each other, an inlet-opening and an exhaust-opening, and inlet and exhaust valves within the said tubes, and operated by the sliding movement of the same, substantially as described.

5. The combination of disks, flexible margins, tubes on the disks and slidably engaging each other, an inlet-opening to the inner tube, an exhaust-opening to the outer tube, a valve-seat closing the inner tube, a valve engaging said seat and operated by the descent of the inner tube and a valve closing the exhaust-opening and opened by the ascent of the inner tube, substantially as described.

6. In combination with an air-cushion, tubes attached to the respective sides of the air-cushion and slidably engaging each other, means for admitting air to the inner tube, an inlet-valve closing the lower end of the said tube, an exhaust-opening in the lower tube, a valve closing the same, and means for opening the inlet-valve when the inner tube moves downward, and means for opening the exhaust-valve when the said tube moves upward, substantially as described.

7. In a pneumatic spring, a disk having an exhaust-opening, and an upwardly-projecting tube, a disk having an inlet-opening and a tube projecting downward and slidably engaging the interior of the first-named tube, a valve-seat in the lower end of the inner tube, having a central opening and a series of inlet-openings, a valve-stem in the central opening and having a flange and an axial opening, a valve closing the exhaust-opening and having a slotted stem inserted in the said axial opening, and provided with a longitudinal slot, and a pin engaging and traversing the slot, substantially as described.

8. In a pneumatic spring, a disk having an exhaust-opening, a disk above the same having a downwardly-projecting inlet-valve provided with an axial opening, a valve closing the exhaust-opening, and having a stem movable in the opening of the inlet-valve, washers on the stem to engage and lift the inlet-valve and means for limiting the movement of the stem of the exhaust-valve in the inlet-valve opening, substantially as described.

9. The combination of a concavo-convex disk having a flexible margin, an exhaust-opening, and an upwardly-projecting tube; a concavo-convex disk having a flexible margin secured to the same on the first-named disk, a downwardly-projecting tube slidably engaging the interior of the first-named tube, and an inlet-opening to admit air to the said tube, a valve-seat in the lower end of the inner tube having a central opening and inlet-openings, a valve-stem in the central opening having an axial opening and flange, a valve closing the exhaust-opening and having a stem in the axial opening of the inlet-valve and provided with a slot, and a pin engaging and traversing the slot, substantially as described.

In testimony whereof I affix my signature in presence of two witnesses.

WARREN W. ANNABLE.

Witnesses:
 PALMER A. JONES,
 LUTHER V. MOULTON.